Oct. 2, 1956  S. J. EVERETT  2,764,978
LOCKING DEVICE FOR HYPODERMIC NEEDLES
Filed Nov. 13, 1953  2 Sheets-Sheet 1
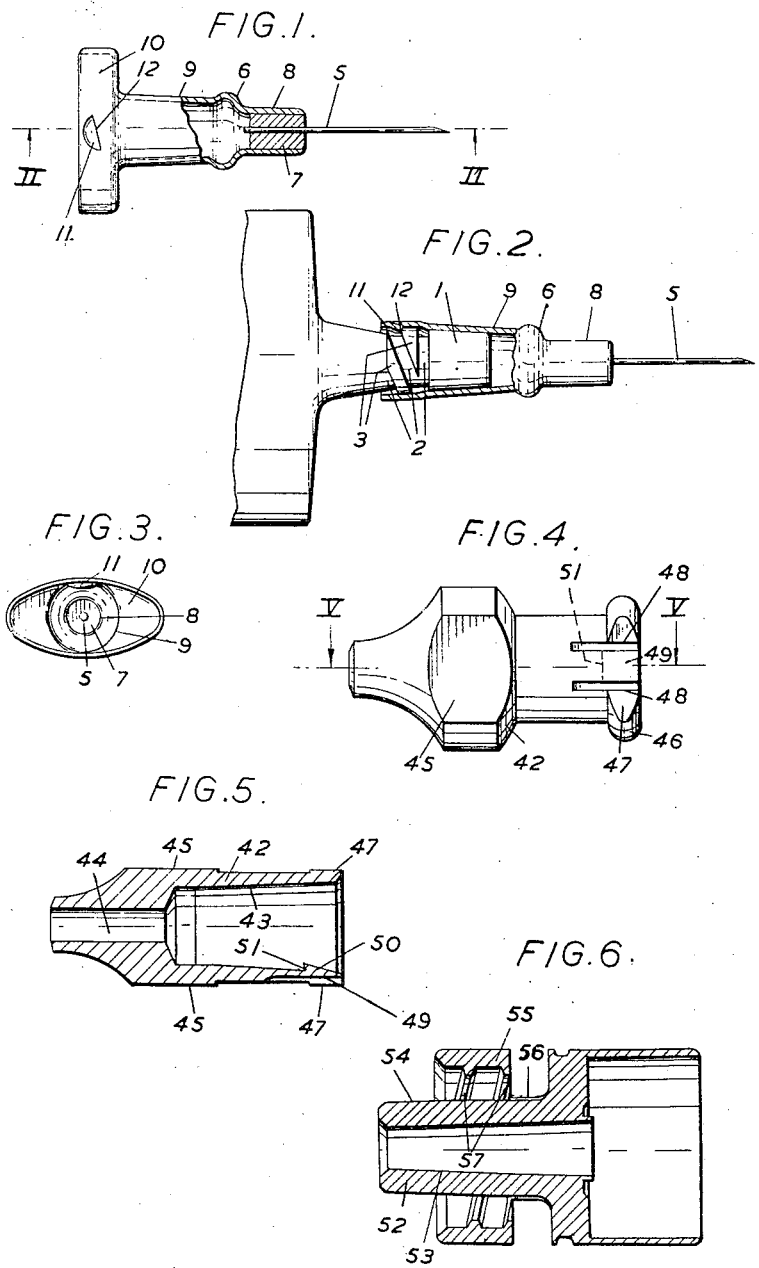
Inventor
SAMUEL JAMES EVERETT,
By Robert B. Larson
Attorney Oct. 2, 1956  S. J. EVERETT  2,764,978
LOCKING DEVICE FOR HYPODERMIC NEEDLES
Filed Nov. 13, 1953  2 Sheets-Sheet 2
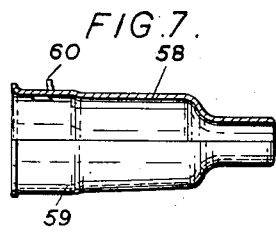
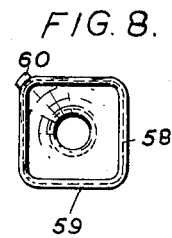
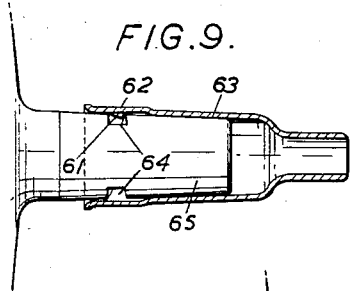
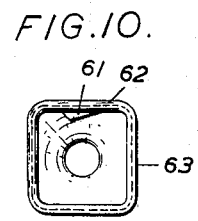
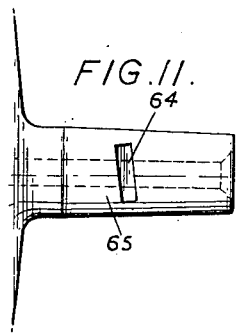
Inventor
SAMUEL JAMES EVERETT,
By
Attorney

… …

United States Patent Office 2,764,978
Patented Oct. 2, 1956

2,764,978

LOCKING DEVICE FOR HYPODERMIC NEEDLES

Samuel James Everett, Thornton Heath, England, assignor to S. & R. J. Everett & Company Limited, Thornton Heath, England, a British company Application November 13, 1953, Serial No. 392,010

16 Claims. (Cl. 128—215)

This invention relates to hypodermic needles and is particularly concerned with the attachment of needles to the nozzles of hypodermic syringes.

Hypodermic needles should be held rigidly on the nozzle of a syringe so that an effective seal is formed between the nozzle and the mount provided on the needle to engage the nozzle. Various types of push-on and screw connections have been proposed, and the present invention provides an improved arrangement for securing a needle to the nozzle, including a simplified construction of the needle mount, and enabling the mount to be gripped easily and in such a way as to minimize the risk of contamination when fitting the needle to the syringe. The invention provides a readily engageable securing lock to hold the mount in tight sealing engagement with the nozzle.

According to the invention the tapered nozzle of a hypodermic syringe is formed with one or more ribs or grooves inclined at a small angle to a plane perpendicular to the axis of the syringe, and a needle is fixed in a mount having a bore tapered to fit the nozzle and provided with a springy detent positioned and shaped so that when the mount is fitted on to the nozzle, it can pass into engagement with the rib or groove to prevent the mount being pulled directly off the nozzle, the inclination of the rib or groove enabling the mount to be drawn into tight engagement with the nozzle by turning the mount about the axis of the needle relatively to the nozzle. The mount may be stamped from sheet metal to form a tapered tubular body adapted to fit the syringe nozzle and an integral finger piece at the rear end of the body may be provided by stamping radial projections from the body. The body may be stamped from stainless steel, brass, or other suitable sheet or strip metal. The needle may be secured in the body by a tubular rivet swaged into the body and through which the needle passes.

In the accompanying drawings:

Figure 1 shows one form of mount stamped from sheet metal;

Figure 2 shows a section of Figure 1 on the line II—II in position on the nozzle of a syringe;

Figure 3 shows an under view of the mount in Figure 1, as seen from the left;

Figure 4 shows a turned mount according to the invention;

Figure 5 is a section of Figure 4 on the line V—V;

Figure 6 is a longitudinal section of a Luer-lock type syringe nozzle;

Figure 7 shows a mount according to the invention for use with the nozzle of Figure 6;

Figure 8 shows a view of the mount seen in Figure 7, as seen from the left;

Figure 9 shows a further form of stamped mount in position on a nozzle;

Figure 10 shows a view of the mount seen in Figure 9, from the left;

Figure 11 shows a plan view of the nozzle shown in Figure 9;

Referring to Figures 1 and 3, the nozzle of the syringe is formed of case hardened stainless steel and consists of a tapered spigot 1 grooved at 2 to form a pair of quick start threads 3. The spigot has the usual bore to permit fluid in the syringe to pass into the needle.

The needle shaft 5 is secured in a stamped mount 6 by means of a tubular rivet 7 through which the shaft 5 passes, and which is swaged into the front end 8 of the mount 6. The body 9 of the mount 6 is tapered to fit the spigot 1 and at the rear end is flared out as shown to form an elliptical finger piece 10. On the minor axis of the ellipse the rear end of the mount is continuous with the tapered body 9 so as to lie close to the spigot 1, as seen in Figures 2 and 3, and at one end of the minor axis, a detent 11 is pressed inwards, so as to have an edge 12 facing forwards. As will be seen in Figure 2, the detent offers little resistance when the mount is pushed on to the spigot 1, and rides easily over the threads 3, but the edge 12 prevents the detent being pulled directly off by engaging behind the threads 3, as shown in Figure 2. Thus, by twisting the mount in one direction it can be screwed on to the nozzle, and by twisting it in the other direction, it can be released from the nozzle.

In Figures 4 and 5, the mount is turned from brass and comprises a body 42 with a tapered bore 43 leading to a bore 44 in which the needle is secured. The body 42 has diametrically opposite flats 45 to form finger pieces, and the rear end of the body 42 is formed with a collar 46 to reinforce it. Flats 47 are cut on this collar corresponding to the flats 45, and through one of these flats a pair of saw cuts 48 are made parallel to the axis of the mount. The metal between these saw cuts forms a tab 49, and the rear end of this is shaped as shown at 50 into a wedge having a sloping face enabling it to pass over projections such as the threads 3 in Figures 1 to 3. The front face 51 is radial, however, and thus forms a resiliently mounted detent acting in the same way as the detent 11 in Figures 1 to 3.

Figure 6 shows a Luer-lock type of syringe nozzle comprising a spigot 52 having an internal bore 53 and tapered externally as at 54. The spigot is encircled by a sleeve 55 attached to the spigot by parts 56, and having a pair of internal threads 57. Figures 7 and 8 show a stamped mount similar to the mount shown in Figures 1 to 3 and made by a similar process, but arranged for use with the nozzle shown in Figure 6. The tapered stamped body 58 is flared at the rear end into a square section 59 as shown in Figure 8, and a detent 60 is pressed outwards at one corner. Thus, at the centre of each side of the square rear end, the body makes contact with the spigot 52 when the mount is fitted to the nozzle, but the detent 60 is held sufficiently far from the axis of the nozzle by the square shape of the rear end to engage one or other of the threads 57 on the sleeve 55. The square rear end, of course, affords a finger grip.

Figures 9 and 10 show a similar mount to Figures 7 and 8, but in which the detent 61 is pressed inwards from the centre of one side 62 of the square end of the mount 63, so as to be capable of engaging one of a pair of grooves 64, formed in the nozzle 65. As seen in Figure 11, each of the grooves 64 makes an angle of about 5 degrees with a plane perpendicular to the axis of the needle and nozzle.

I claim:

1. A hypodermic syringe comprising a barrel formed with a tapered nozzle, at least one member rigid with said nozzle having a locking face extending substantially radially in relation to the axis of said nozzle, said locking face being inclined at a small angle to a plane perpendicular to the axis of said nozzle, a needle mount, a hypodermic needle fixed in said mount, said mount having a bore tapered correspondingly to said nozzle and fitted on said nozzle and having a springy detent so shaped and in such a position that, when the needle mount is fitted onto said nozzle, said detent can pass into engagement with said locking surface to prevent the mount being pulled directly off said nozzle, the inclination of said locking surface enabling said mount to be drawn into tight engagement with said nozzle by turning the mount relative to said nozzle about the axis of said nozzle.

2. A hypodermic syringe according to claim 1 in which the locking face is one face of a substantially helical groove in said nozzle.

3. A hypodermic syringe according to claim 1 in which the locking face is one face of a substantially helical rib on the said nozzle.

4. A hypodermic syringe according to claim 3 in which the mount is flared out at the rear end to a substantially square section, the corners of the square forming four projections acting as finger pieces.

5. A hypodermic syringe according to claim 1 in which the detent is bent from the body of the mount.

6. A hypodermic syringe according to claim 5 in which the body of the mount is of sheet metal.

7. A hypodermic syringe according to claim 6 in which the needle is secured in the mount by a tubular rivet through which the needle runs.

8. A hypodermic syringe according to claim 6 in which the body is flared out at the rear end at two diametrically opposite points to form a finger piece.

9. A hypodermic syringe according to claim 1 in which the nozzle of the syringe is formed of case-hardened stainless steel.

10. A hypodermic syringe according to claim 1 comprising a nozzle tapered to take the needle mount and a sleeve surrounding said nozzle and spaced from it sufficiently to admit the needle mount, the locking face being formed on the bore of the sleeve and the detent projecting outwardly from the mount.

11. A hypodermic syringe according to claim 10 in which the mount is of sheet metal and, to engage with ribs or grooves formed on said sleeves, the rear end of the mount is flared to a square section, and the detent is bent outwardly from the rear end at one corner.

12. A hypodermic needle mount for use with a syringe having a tapered nozzle and a substantially helical locking surface on said nozzle, said mount comprising, a tubular sheet metal body having a tapered bore to fit said nozzle, a detent resiliently yieldable radially with respect to the axis of said bore, and having a locking surface extending substantially radially to said axis and facing the point of the needle for engaging said substantially helical locking surface on said nozzle to prevent said mount being drawn off said nozzle when the detent is engaged with said locking surface, a tubular rivet held rigidly in said mount and through which said needle passes to secure said needle, said detent being integral with and bent from the rear end of said body.

13. A hypodermic needle mount according to claim 12 in which the body is flared out at the rear end at two diametrically opposite points to form finger pieces.

14. A hypodermic needle mount according to claim 13 in which the detent is bent inwardly from that part of the rear end of the body which is not flared.

15. A hypodermic needle mount according to claim 12 in which the mount is flared out at the rear end to a substantially square section, the corners of the square forming four projections acting as finger pieces.

16. A hypodermic needle mount according to claim 15 in which the detent is bent outwardly from the rear end of said mount at one corner.

References Cited in the file of this patent

UNITED STATES PATENTS

| | | |
|---|---|---|
| 1,712,070 | Cressler | May 7, 1929 |
| 1,757,680 | Neil | May 6, 1930 |
| 1,793,068 | Dickinson | Feb. 17, 1931 |
| 2,088,338 | Popper et al. | July 27, 1937 |
| 2,617,359 | Van Horn et al. | Nov. 11, 1952 |

FOREIGN PATENTS

| | | |
|---|---|---|
| 536,212 | Germany | Oct. 21, 1931 |